US007007818B2

(12) United States Patent
Martin

(10) Patent No.: US 7,007,818 B2
(45) Date of Patent: Mar. 7, 2006

(54) CONTAINER ASSEMBLY

(76) Inventor: Laura Ann Martin, 450 Avenue of the Americas, Apt. 3-C, New York, NY (US) 10011

( * ) Notice: Subject to any disclaimer, the term of this patent is extended or adjusted under 35 U.S.C. 154(b) by 11 days.

(21) Appl. No.: 10/314,504

(22) Filed: Dec. 9, 2002

(65) Prior Publication Data
US 2004/0108285 A1 Jun. 10, 2004

(51) Int. Cl.
B65D 21/024 (2006.01)
(52) U.S. Cl. .................................... 220/23.4; 206/818
(58) Field of Classification Search ............... 222/480, 222/553, 486; 206/818; 220/23.4, 602, 220/377, 288, 303, 366.1
See application file for complete search history.

(56) References Cited

U.S. PATENT DOCUMENTS

| 165,670 | A | | 7/1875 | Goodwin et al. |
| 178,878 | A | | 6/1876 | Putnam |
| 345,554 | A | | 7/1886 | Tate |
| 425,768 | A | | 4/1890 | Ezell |
| 1,215,018 | A | | 2/1917 | Grossman |
| 1,216,252 | A | * | 2/1917 | Ferguson ................. 222/142.6 |
| 1,394,545 | A | | 10/1921 | French |
| D67,752 | S | | 7/1925 | Frahm |
| 1,547,080 | A | | 7/1925 | Swan |
| 1,712,140 | A | | 5/1929 | Flegenheimer |
| 2,004,828 | A | * | 6/1935 | Punte .......................... 220/260 |
| 2,047,951 | A | * | 7/1936 | Felix ........................... 220/377 |
| 2,217,514 | A | | 10/1940 | Henry |
| 2,480,606 | A | | 8/1949 | Rabbitt |
| 2,514,416 | A | | 7/1950 | Plunkett |
| D190,510 | S | | 6/1961 | Grandinetti |
| 3,063,602 | A | | 11/1962 | Anderson |
| 3,096,910 | A | | 7/1963 | Pehr |
| 3,184,098 | A | | 5/1965 | Sabaka |
| 3,323,683 | A | * | 6/1967 | Cianciolo ................ 222/142.6 |
| 3,335,915 | A | | 8/1967 | Shannon |
| 3,642,122 | A | | 2/1972 | Von Ende |
| 3,695,487 | A | | 10/1972 | Slayton et al. |
| 3,731,819 | A | | 5/1973 | Sandhage |
| D233,815 | S | | 12/1974 | Salviato |
| 3,878,971 | A | | 4/1975 | Freedman |
| 4,019,638 | A | | 4/1977 | Miller |
| 4,346,823 | A | | 8/1982 | Eppenbach |
| D267,847 | S | | 2/1983 | Pielert |
| 4,484,682 | A | | 11/1984 | Crow |
| 4,541,551 | A | | 9/1985 | Vierkotter et al. |
| 4,544,063 | A | | 10/1985 | Neward |
| 4,583,667 | A | | 4/1986 | Fishman et al. |
| 4,738,889 | A | | 4/1988 | Lebowitz et al. |

(Continued)

OTHER PUBLICATIONS

Daily System, Pottery Barn, Winter 2004, pp. 36-37, San Francisco, California.

(Continued)

*Primary Examiner*—Stephen Castellano
(74) *Attorney, Agent, or Firm*—Armstrong Teasdale LLP

(57) ABSTRACT

A spice rack assembly includes a rack and at least one container that is magnetically coupled to the rack. The at least one container comprises a body and a lid. The body comprises a sidewall and a bottom, wherein the sidewall circumscribes the bottom. The lid is coupled to the body such that a cavity is defined by an inner surface of the lid, an inner surface of the sidewall, and an inner surface of the bottom. The container sidewall comprises an opening extending therethrough in flow communication with the cavity.

21 Claims, 2 Drawing Sheets

U.S. PATENT DOCUMENTS

| | | |
|---|---|---|
| 4,819,815 A | 4/1989 | Tarlow et al. |
| D303,900 S | 10/1989 | Ancona et al. |
| 4,984,720 A | 1/1991 | Groya et al. |
| D314,491 S | 2/1991 | Carter et al. |
| 5,020,699 A | 6/1991 | Sams |
| 5,054,663 A | 10/1991 | Groya et al. |
| 5,123,574 A | 6/1992 | Poulos |
| 5,186,350 A * | 2/1993 | McBride ............... 220/739 |
| 5,193,722 A | 3/1993 | Groya et al. |
| 5,240,155 A | 8/1993 | Mueller et al. |
| 5,246,133 A * | 9/1993 | James ............... 220/377 |
| 5,367,278 A | 11/1994 | Yoshikawa |
| 5,368,203 A * | 11/1994 | Friedrich et al. ....... 222/179.5 |
| 5,407,107 A * | 4/1995 | Smith ............... 222/548 |
| 5,411,186 A | 5/1995 | Robbins, III |
| 5,456,359 A | 10/1995 | Horn |
| 5,465,871 A * | 11/1995 | Robbins, III ............... 222/23 |
| 5,489,049 A | 2/1996 | Robbins, III |
| 5,544,747 A | 8/1996 | Horn |
| D379,148 S | 5/1997 | Robbins, III et al. |
| 5,655,673 A | 8/1997 | Weterrings et al. |
| 5,660,276 A | 8/1997 | Winnard |
| 5,669,516 A | 9/1997 | Horn |
| D402,512 S | 12/1998 | Lee et al. |
| 5,850,950 A | 12/1998 | Hofmann |
| D405,999 S | 2/1999 | Lee et al. |
| 5,871,107 A | 2/1999 | Johnson et al. |
| 5,873,486 A * | 2/1999 | Morgan ............... 220/739 |
| D407,306 S | 3/1999 | Saab |
| 5,947,329 A | 9/1999 | Bailey |
| 6,039,224 A | 3/2000 | Dallas, Jr. et al. |
| 6,047,837 A | 4/2000 | Kessens |
| 6,065,632 A | 5/2000 | Moore, Jr. |
| 6,279,760 B1 | 8/2001 | Broeski |
| 6,283,339 B1 | 9/2001 | Morrow |
| 6,305,656 B1 | 10/2001 | Wemyss |
| 6,318,569 B1 | 11/2001 | Rothing |
| 6,422,426 B1 | 7/2002 | Robbins, III et al. |
| D468,162 S | 1/2003 | Martin |
| 2004/0026420 A1 | 2/2004 | Smith |

OTHER PUBLICATIONS

S.T. International Group, Inc., Catalog, "Storage Boxes," p. 73.

Lionel Trains Library, Catalog, "Magnetic Milk Can Set 1947-1959," undated Mar. 24, 2000.

John Cleary, Clearco Products Co., Inc., Declaration and Catalog pages.

Kamenstein, Catalog for Magnet Ware, copyrighted 1998.

Lee Valley & Veritas, Fall Projects flyer, 1999.

Lee Valley, Fine Woodworking Tools flyer, 1996.

* cited by examiner

US 7,007,818 B2

CONTAINER ASSEMBLY

BACKGROUND OF THE INVENTION

This invention relates generally to container assemblies, and more particularly, spice container and rack assemblies.

At least some known houses include a pantry area attached to the kitchen for storing goods used in the kitchen including spices. In fact, at least some known kitchen pantries include racks or shelves that are dedicated to storing known spice shakers or known spice containers. However, because of the orientation of the spice container with respect to the racks, removing a spice shaker from the rack may be cumbersome. As a result, frequently used spices may not be stored in the rack, which makes such spices more accessible, but also may undesirably clutter the kitchen.

Known spice containers include a body and a lid that is threadably coupled to the body. Accordingly, the lid must be unscrewed from the container body to discharge the container contents from the container. To expedite the seasoning process, at least some other known spice containers include a shaker top that includes a plurality of openings that permit the container contents to exit the container when the container is inverted. However, as a result of the openings, such lids may also undesirably permit a loss of aroma of the spices when the spices are stored, which over time, may decrease the effectiveness, freshness, and/or potency of the container contents.

BRIEF SUMMARY OF THE INVENTION

In one aspect, a container assembly is provided. The container assembly comprises at least one container and a base. The container comprises a hollow body and a lid. The body comprises a sidewall and a bottom, wherein the sidewall circumscribes the bottom. The lid is removably coupled to the body such that a cavity is defined by the body and the lid. The at least one container base is magnetically coupled to the base.

In another aspect of the invention, a spice rack assembly is provided. The spice rack assembly comprises a rack and at least one container that is magnetically coupled to the rack. The at least one container comprises a body and a lid. The body comprises a sidewall and a bottom, wherein the sidewall circumscribes the bottom. The lid is coupled to the body such that a cavity is defined by an inner surface of the lid, an inner surface of the sidewall, and an inner surface of the bottom. The container sidewall comprises an opening extending therethrough in flow communication with the cavity.

DETAILED DESCRIPTION OF THE INVENTION

Figure 1:
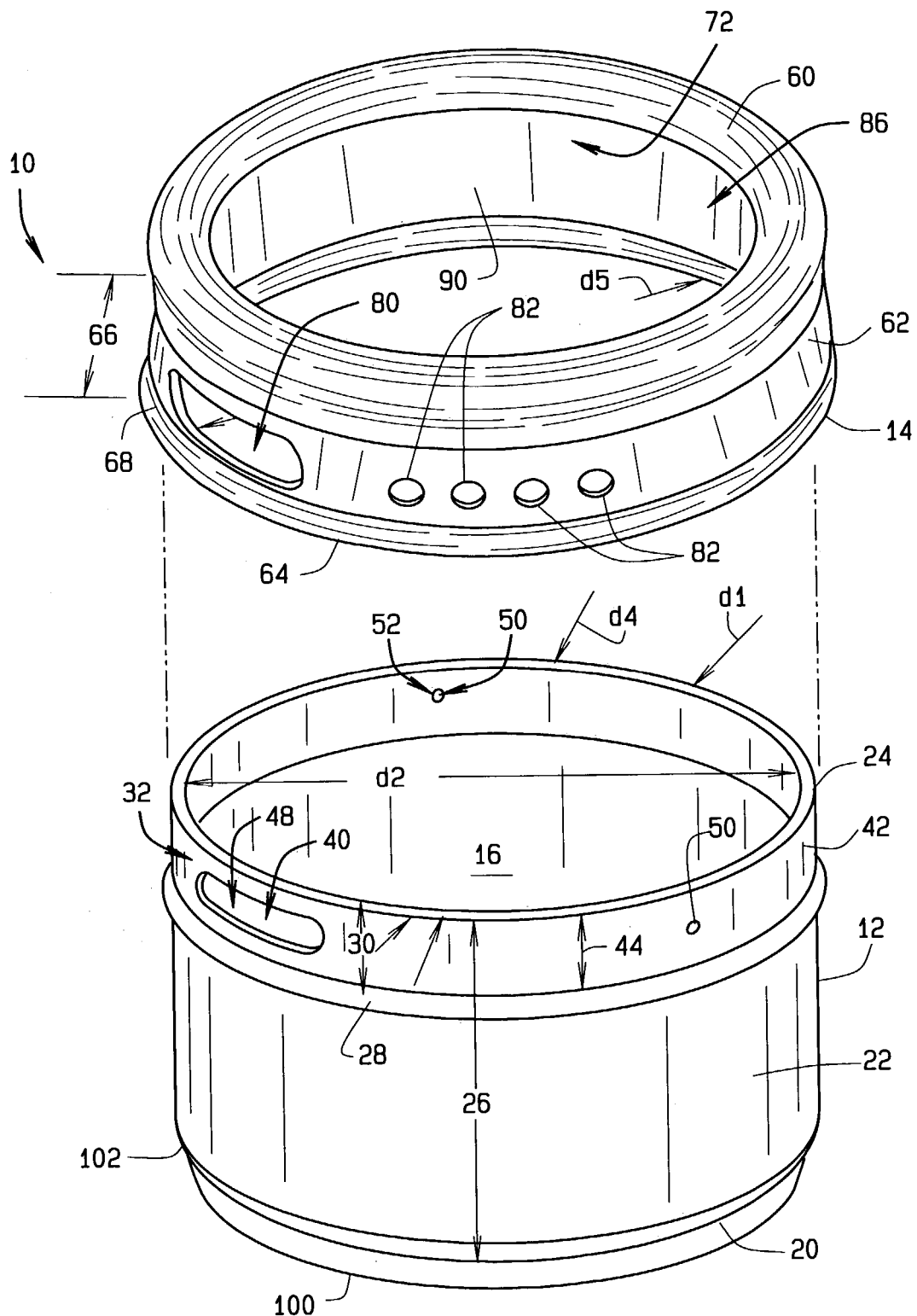
FIG. 1 is perspective exploded view of an exemplary spice container.

FIG. 1 is a perspective view of an exemplary spice container 10. Container 10 includes a body portion 12 and a lid 14 that is rotatably coupled to lid 14. In the exemplary embodiment, body portion 12 and lid 14 both have a substantially circular cross-sectional profile. In an alternative embodiment, at least one of body portion 12 and lid 14 has a substantially non-circular cross-sectional profile. When lid 14 is coupled to body portion 12, a cavity 16 is defined therein.

Body portion 12 has a bottom 20 and a sidewall 22 that circumscribes bottom 20 and extends outwardly therefrom. More specifically, in the exemplary embodiment, sidewall 20 extends substantially perpendicularly from bottom 20 to a rim 24 for a height 26 measured between bottom 20 and rim 24. Sidewall 20 is substantially cylindrical and includes a flange 28 that extends outwardly therefrom. Flange 28, as described below, positions lid 14 with respect to body portion 12 to facilitate sealing between body portion 12 and lid 14. More specifically, flange 28 circumscribes sidewall 22 at a distance 30 from body rim 24, such that a sealing area 32 is defined between rim 24 and flange 28.

Sidewall 22 includes a slotted opening 40 that extends through sidewall 22. More specifically, opening 40 extends through sealing area 32 and in the exemplary embodiment, is substantially elliptical. As described below in more detail, opening 40 enables the contents of container 10 to be emptied while lid 14 remains coupled to body portion 12. Alternatively, opening 40 is non-elliptical.

A ring seal 42 circumscribes sidewall 22 and is positioned within seal area 32, in contact with flange 26. Accordingly, seal 42 has a width 44 that is approximately equal to, or less than, seal area width 30. Seal 42 includes an opening 48 and a pair of identical retainers 50. Opening 48 extends through seal 48 and is sized approximately identically to sidewall opening 40. When assembled, seal opening 48 is aligned substantially concentrically with respect to sidewall opening 40.

Retainers 50 extend radially inwardly from seal 48 to facilitate maintaining seal 48 in alignment with respect to sidewall 22. Specifically, seal retainers 50 extend through a pair of diametrically opposed retainer openings 52 extending through sidewall 22. In the exemplary embodiment, body portion 12 has an outer diameter $d_1$ measured with respect to an outer surface 54 of sidewall 22, and seal 48 has an inner diameter $d_2$ that is slightly larger than outer diameter $d_1$.

Lid 14 includes a cap 60 and a sidewall 62 that circumscribes cap 60 and extends outwardly therefrom. More specifically, in the exemplary embodiment, sidewall 62 extends substantially perpendicularly from cap 60 to a rim 64 for a height 66 measured between cap 60 and rim 64. Sidewall 62 is substantially cylindrical and includes a flange seat 68 that extends outwardly therefrom. Flange seat 68, cooperates with, and mates against, body portion flange 28 to facilitate enhanced sealing between body portion 12 and lid 14. More specifically, flange seat 68 circumscribes sidewall 62 adjacent from rim 64, such that a sealing area 72 is defined between flange seat 68 and cap 60.

Sidewall 62 includes a slotted opening 80 and a plurality of closely-spaced shaker openings 82. More specifically, openings 80 and 82 extend through sidewall 62 within sidewall sealing area 72. In the exemplary embodiment, opening 80 is sized substantially identically with openings 40 and 48, and openings 82 are each sized identically, and are arranged in a row. Alternatively, openings 82 are sized differently. An overall size and position of openings 82 is variably selected to facilitate discharging the contents of container 10 therethrough.

In the exemplary embodiment, cap 60 includes a transparent window 86 that provides a visual indication of any contents of container 10.

Lid 14 has an inner diameter $d_3$ measured with respect to an inner surface 90 of cap sidewall 62. Lid inner diameter $d_3$ is slightly larger than an outer diameter $d_4$ of seal 48 such that when lid 14 is coupled to body portion 12, cap sidewall 62 is in sealing contact with seal 48, and remains in sealing contact even while 14 is rotated with respect to seal 48 and body portion 12. Furthermore, when lid 14 is coupled to body portion 12, seal 48 is positioned radially inwardly from cap sidewall 62 between cap sidewall 62 and body portion sidewall 22.

A magnet 100 is affixed to body portion 12 for magnetically coupling container 10 to a rack assembly (not shown in FIG. 1). Specifically, magnet 100 is affixed to an outer surface 102 of body portion bottom 20. In the exemplary embodiment, magnet 100 is substantially circular. Alternatively, magnet 100 is non-circular. Magnet 100 has a cross-sectional profile that is smaller than a cross-sectional profile of body portion 20, and accordingly, magnet 100 remains in a signature footprint created between bottom 20 and the rack assembly.

During use, container cavity 16 is filled with dry goods, such as, but not limited to seasonings, or spices. Lid 14 is then slidably coupled to body portion 12 such that lid flange seat 68 is positioned against a portion of body portion flange 28. Because flange seat 68 is contoured to substantially match a contoured radius of flange 28, flange seat 68 and flange 28 are coupled in a mating relationship, and cap sidewall 62 is positioned in sealing contact against seal 48. More specifically, the tight tolerance and sealing contact between lid 14 and body portion 12 facilitates maintaining the dry goods in a substantially air-tight environment such that a freshness and useful life of the dry goods is extended.

When a spice is desired to be discharged from container 10, lid 14 is rotated until either lid opening 80 or lid openings 82 are radially aligned with body portion opening 40 and seal opening 48. When rotation of lid 14 is complete, slightly inverting container 10 enables the contents of cavity 16 to be discharged through either opening 80 or openings 82.

Figure 2:
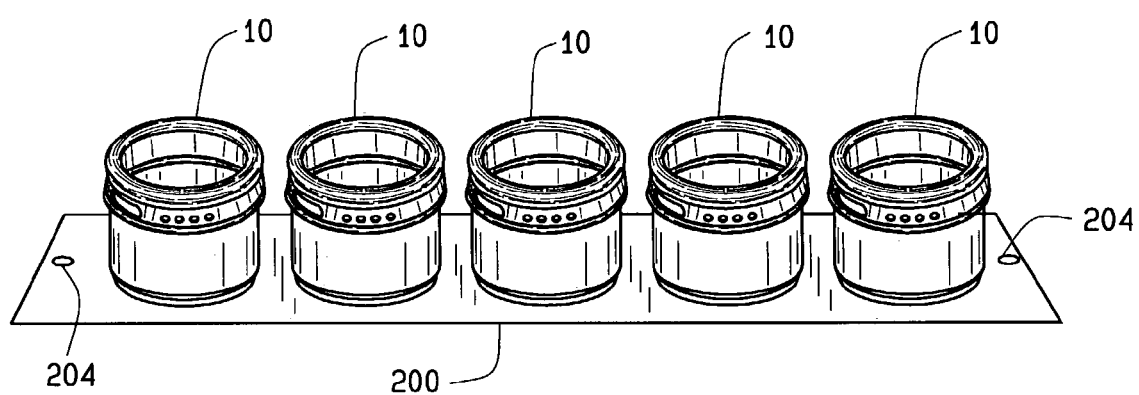
FIG. 2 is a perspective view of an exemplary spice rack including the spice container shown in FIG. 1.

FIG. 2 is a perspective view of an exemplary spice rack 200 including spice container 10. Spice rack 200 is fabricated from a metallic material to enable container 10 to be magnetically coupled to rack 200. In the exemplary embodiment, rack 200 is substantially planar and includes a pair of mounting openings 204 extending therethrough. Mounting openings 204 enable rack 200 to be mounted in a plurality of orientations.

In the exemplary embodiment, rack 200 is sized to enable five containers 10 to magnetically couple thereto. However, it should be noted that overall dimensions of spice rack 200 are variably selected depending upon the quantity of spice containers 10 to be coupled thereto. For example, in one embodiment, rack 200 is substantially rectangular-shaped and is sized to magnetically couple a plurality of rows of containers 10.

The above-described container assembly and spice rack is cost-effective and highly reliable. The container includes a sealing ring that facilitates maintaining sealing contact between the container lid and container body, while still enabling the container lid to be rotatably coupled to the container body. Each container also includes a magnetic base that enables each container to be magnetically coupled to a rack that may be mounted in a plurality of orientations. As a result, an assembly is provided which facilitates storing and dispensing spices in a cost-effective and reliable manner.

Exemplary embodiments of spice racks and container assemblies are described above in detail. The methods are not limited to the specific embodiments described herein, but rather, aspects of each container assembly may be utilized independently and separately from other container assemblies described herein. Each spice rack assembly component can also be used in combination with other spice rack assembly components.

While the invention has been described in terms of various specific embodiments, those skilled in the art will recognize that the invention can be practiced with modification within the spirit and scope of the claims.

What is claimed is:

1. A container assembly comprising:
   a hollow body comprising a sidewall, a bottom, and a cavity defined therein, said sidewall circumscribing said bottom and said sidewall comprising a flange circumscribing said sidewall, said sidewall extending from said bottom to a rim, said bottom comprising a bottommost surface;
   a lid comprising a sidewall and a top, said sidewall circumscribing said top, wherein at least a portion of said top comprises a transparent material, said lid configured to removably couple to said body such that said lid sidewall circumscribes a portion of said body sidewall and engages said flange, said flange for positioning said lid with respect to said body, at least a portion of said transparent material is in sealing contact with an inner surface of said top when said lid is coupled to said hollow body; and
   a magnet coupled to an exterior surface of said bottom, said magnet extends outwardly beyond said container bottommost surface, wherein the horizontal cross sectional profile of the magnet is smaller than the horizontal cross sectional profile of the hollow body.

2. A container assembly in accordance with claim 1 wherein said transparent material is centered with respect to said lid.

3. A container assembly in accordance with claim 1 wherein said transparent material is plastic and wherein said body is metallic.

4. A container assembly in accordance with claim 1 wherein said transparent material is recessed with respect to an outer surface of said lid.

5. A container assembly comprising:
   at least one container comprising a hollow body and a lid, said body comprising a sidewall and a bottom having a bottommost surface, said body sidewall comprising an annular shoulder unitarily formed with and circumscribing said body, at least a portion of said lid comprising a transparent material, said lid removably coupled to said body such that a cavity is defined by said body and said lid, said shoulder engages said lid sidewall for positioning said lid with respect to said body, at least a portion of said lid comprises non-transparent material, wherein the horizontal cross sectional profile of the magnet is smaller than that horizontal cross sectional profile of the hollow body;
   a magnet extending outward beyond said bottommost surface; and
   a base, said container bottom magnetically coupled to said base, said base sized to accommodate at least two of said container bottoms magnetically coupled thereto.

6. A container assembly comprising:
   at least one container comprising a hollow body and a lid, said body comprising a sidewall and a bottom having a bottommost surface, said body sidewall comprising an annular shoulder unitarily formed with and circumscribing said body, said sidewall circumscribing said bottom, at least a portion of said lid comprising a transparent material, said lid removably coupled to said body such that a cavity is defined by said body and said lid, said lid comprising a height that is shorter than a height of said body sidewall, said shoulder engages said lid sidewall for positioning said lid with respect to said body, at least a portion of said lid comprises non-transparent material, wherein the horizontal cross sectional profile of the magnet is smaller that the horizontal cross sectional profile of the hollow body;

a magnet extending outward beyond said bottommost surface; and a base, said container bottom magnetically coupled to said base, said base sized to accommodate at least two of said container bottoms magnetically coupled thereto.

7. A container assembly in accordance with claim 1 wherein said container lid comprises at least one opening extending therethrough.

8. A container assembly in accordance with claim 1 wherein said container body sidewall comprises at least one opening extending therethrough.

9. A container assembly in accordance with claim 1 further comprising a seal extending between said container lid and said container body.

10. A container assembly in accordance with claim 1 wherein said container lid is slidably coupled to said container body.

11. A container assembly in accordance with claim 1 wherein said container lid comprises a sidewall and a top, said sidewall circumscribing said top, said lid configured to couple to said container body such that said lid sidewall circumscribes a portion of said container body sidewall.

12. A container assembly in accordance with claim 11 wherein said container lid sidewall comprises at least one opening extending therethrough.

13. A container assembly in accordance with claim 12 wherein said container body sidewall comprises at least one opening extending therethrough, a cross-sectional area of said body sidewall opening larger than said at least one container lid opening.

14. A spice rack assembly comprising:
a rack;
a magnet; and
at least one container magnetically coupled to said rack, said at least one container comprising a body and a lid, said body comprising a sidewall and a bottom having a bottommost surface, said sidewall circumscribing said bottom and extending from said bottom to a rim, said lid coupled to said body such that a cavity is defined by an inner surface of said lid, an inner surface of said sidewall, and an inner surface of said bottom, at least a portion of said lid comprising a transparent material, said lid comprising a sidewall circumscribing a portion of said body sidewall, at least a portion of said lid sidewall comprises non-transparent material, said container sidewall comprising an opening extending therethrough in flow communication with said cavity, said rack sized to receive at least two of said containers magnetically coupled thereto, said magnet extending outwardly beyond said bottommost surface, wherein the horizontal cross sectional profile of the magnet is smaller that the horizontal cross sectional profile of the body.

15. A spice rack assembly in accordance with claim 14 wherein said container lid comprises at least one opening extending therethrough, said lid rotatable such that said container lid opening is substantially concentrically aligned with respect to said container sidewall opening.

16. A spice rack assembly in accordance with claim 14 further comprising a seal extending between said container lid and said container body.

17. A spice rack assembly in accordance with claim 14 wherein said container lid is slidably coupled to said container body.

18. A spice rack assembly in accordance with claim 14 wherein said container lid comprises a sidewall and a top, said sidewall circumscribing said top, said lid configured to couple to said container body such that said lid sidewall circumscribes a portion of said container body sidewall.

19. A spice rack assembly in accordance with claim 14 wherein said container body sidewall comprises at least one opening extending therethrough, a cross-sectional area of said body sidewall opening larger than said at least one container lid opening.

20. A spice rack assembly in accordance with claim 14 wherein said magnet has a cross-sectional area that is smaller than a cross-sectional area of said container bottom.

21. A spice rack assembly in accordance with claim 14 wherein said container is substantially circular, said container lid having a first diameter, said container body having a second diameter smaller than said first diameter.

* * * * *